(12) United States Patent
Shimotsu

(10) Patent No.: US 6,726,370 B2
(45) Date of Patent: Apr. 27, 2004

(54) FERRULE FOR AN OPTICAL FIBER AND MANUFACTURING METHOD THEREOF

(75) Inventor: Akihiro Shimotsu, Ebina (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/771,273

(22) Filed: Jan. 26, 2001

(65) Prior Publication Data

US 2001/0017963 A1 Aug. 30, 2001

(30) Foreign Application Priority Data

Jan. 31, 2000 (JP) ..................................... 2000-027305

(51) Int. Cl.⁷ ................................................. G02B 6/36
(52) U.S. Cl. .......................... 385/78; 385/76; 385/77; 385/60; 385/66; 385/139
(58) Field of Search .................... 385/78, 84, 60, 385/139, 66, 68, 76, 77

(56) References Cited

U.S. PATENT DOCUMENTS

| | | | |
|---|---|---|---|
| 4,479,910 A | * 10/1984 | Kurokawa et al. | 264/2.5 |
| 4,737,009 A | 4/1988 | Kakii et al. | 350/96.2 |
| 4,815,809 A | * 3/1989 | Szostak | 385/84 |
| 4,818,061 A | * 4/1989 | Iwano et al. | 350/96.21 |
| 4,822,130 A | 4/1989 | Maranto et al. | 350/96.2 |
| 4,911,518 A | 3/1990 | Miller | 350/96.2 |
| 4,950,048 A | * 8/1990 | Kakii et al. | 350/96.2 |
| 5,216,734 A | 6/1993 | Grinderslev | 385/60 |
| 5,269,998 A | 12/1993 | Takagi et al. | 264/328.1 |
| 5,375,183 A | 12/1994 | Edwards et al. | 385/60 |
| 5,588,079 A | * 12/1996 | Tanabe et al. | 385/78 |
| 5,621,835 A | * 4/1997 | Takahashi et al. | 385/78 |
| 5,625,730 A | 4/1997 | Ishikawa et al. | 385/49 |
| 5,719,977 A | 2/1998 | Lampert et al. | 385/60 |
| 5,751,875 A | 5/1998 | Edwards et al. | 385/84 |
| 5,845,029 A | * 12/1998 | Matsuoka et al. | 385/84 |
| 5,852,694 A | * 12/1998 | Kimura et al. | 385/78 |
| 5,975,770 A | 11/1999 | Yanagi et al. | 385/78 |
| 6,102,581 A | 8/2000 | Deveau et al. | 385/56 |
| 6,126,325 A | * 10/2000 | Yamane et al. | 385/92 |
| 6,158,900 A | 12/2000 | Omiya et al. | 385/78 |
| 6,325,548 B1 | * 12/2001 | Shirakawa | 385/78 |
| 6,341,191 B1 | * 1/2002 | Takahashi | 385/140 |
| 6,358,874 B1 | * 3/2002 | Kobayashi et al. | 501/105 |
| 6,431,783 B2 | * 8/2002 | Nakajima et al. | 403/275 |
| 6,435,731 B1 | * 8/2002 | Yamaguchi et al. | 385/78 |
| 6,533,469 B1 | * 3/2003 | Nakamura et al. | 385/84 |

FOREIGN PATENT DOCUMENTS

| | | | | |
|---|---|---|---|---|
| EP | 001122564 A2 | * | 8/2001 | 385/139 X |
| JP | 02000147320 A | * | 5/2000 | G02B/6/36 |

* cited by examiner

*Primary Examiner*—Brian M. Healy
(74) *Attorney, Agent, or Firm*—Romi N. Bose

(57) ABSTRACT

The specification and drawings show and describe an embodiment of the present invention in the form of a ferrule for a fiber optic connector having a capillary for receiving an optical fiber and a flange molded onto an outer surface of the capillary. A recess is formed in the outer surface of the capillary prior to the molding process, and a plastic material is injected into a mold containing the capillary, forming both the flange and a projecting portion of the flange which extends into the capillary recess. The features of the molded flange are used for positioning and securing the capillary within the fiber optic connector.

17 Claims, 3 Drawing Sheets

US 6,726,370 B2

FERRULE FOR AN OPTICAL FIBER AND MANUFACTURING METHOD THEREOF

SUMMARY OF THE DRAWING

The present invention relates to a ferrule for an optical fiber and a method for manufacturing the ferrule. The ferrule incorporates a molded flange for precisely positioning the optical fiber within a connector body.

BRIEF DESCRIPTION OF THE INVENTION

Figure 1:
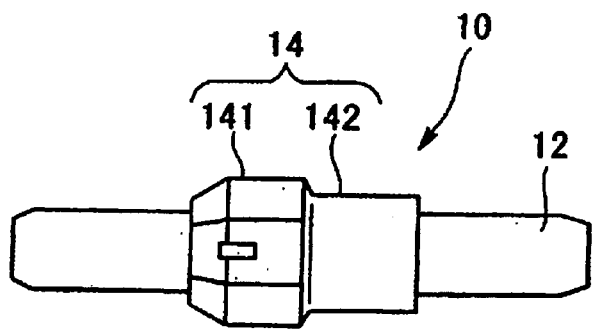
Figure 2:
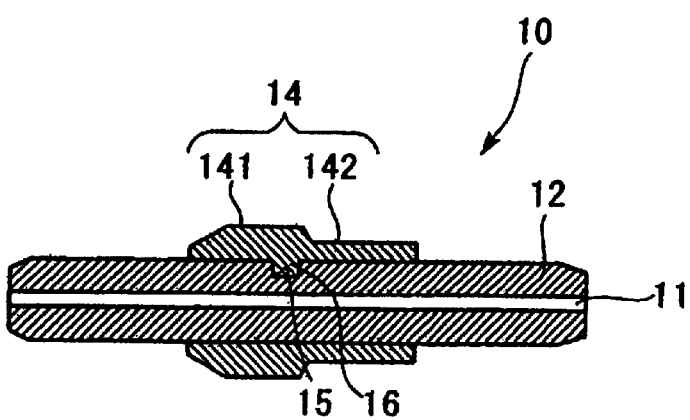
Figure 3:
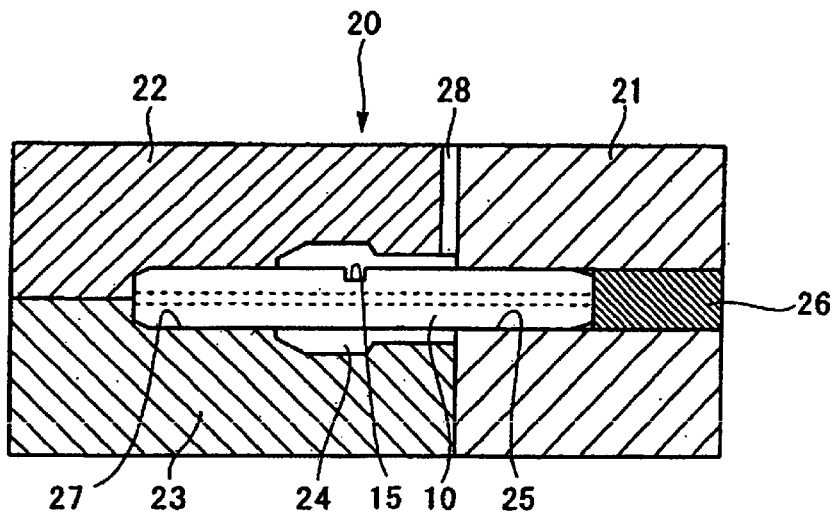
Figure 4:
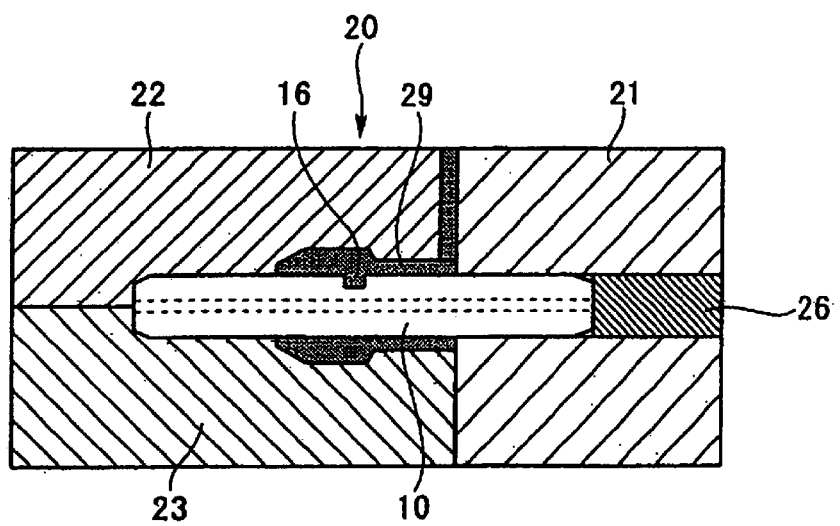
Figure 5:
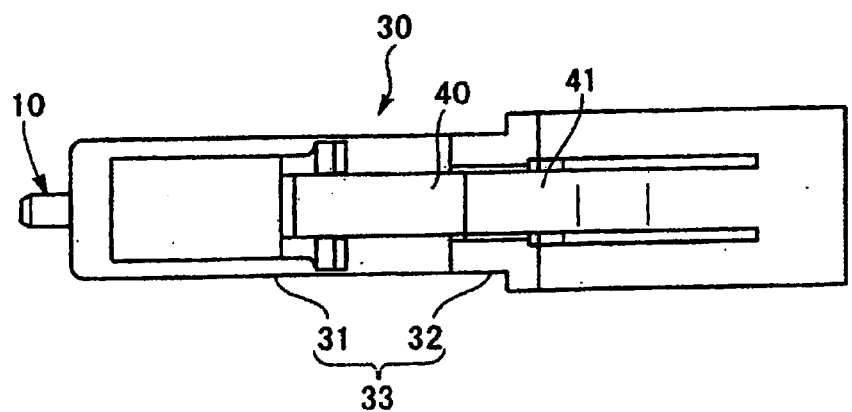
Figure 6:
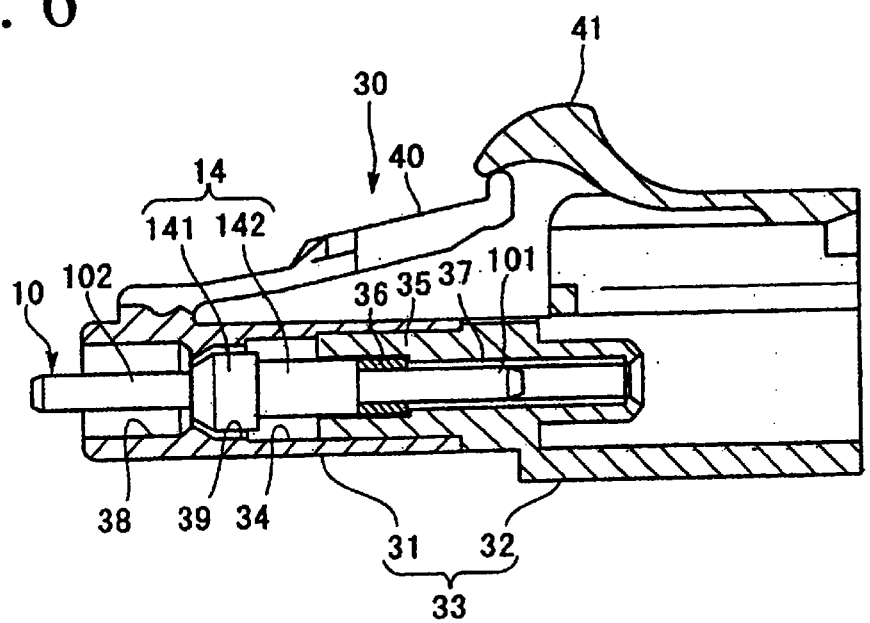

In the accompanying drawings:

FIG. 1 is a plan view of an embodiment of the ferrule of the present invention;

FIG. 2 is a cross-sectional view of the ferrule shown in FIG. 1;

FIG. 3 is a cross-sectional view of a mold used in manufacturing an embodiment of the ferrule of the present invention;

FIG. 4 is the cross-sectional view of the mold shown in FIG. 3 showing the injection of a plastic material into the mold to produce an embodiment of the ferrule of the present invention;

FIG. 5 is a plan view of a connector in which a ferrule according to the present invention may be mounted; and FIG. 6 is a cross-sectional view of the connector of FIG. 5.

DETAILED DESCRIPTION OF THE INVENTION

Referring to the drawings, FIG. 1 shows a plan view and FIG. 2 a cross-sectional view of an embodiment of the present invention. A ferrule 10, for incorporation into an optical fiber connector, comprises a capillary 12 and a cylindrical flange 14 molded onto the capillary.

Capillary 12 has a pair of opposing ends, an outer surface extending between the opposing ends and a through hole 11 extending between the opposing ends into which an optical fiber strand is to be inserted. The capillary 12 is made from a well-known material such as zirconia or the like, using a high-precision fabrication process. As seen in FIG. 2, a recess portion 15 is formed in capillary outer surface for receiving a corresponding projecting portion 16 of a molded flange, in a manner to be described later. An attenuating optical fiber (not shown) is to be inserted into hole 11, positioned and fixed in place by application of a suitable adhesive or the like into hole 11. In a manner known in the art, the optical fiber secured within capillary 12 is configured for attenuating light transmitted between two additional optical fibers (not shown) which abut respective opposing ends of capillary 12 and are properly aligned with the attenuating optical fiber. A plastic flange 14 is molded onto capillary outer surface. Flange 14 is positioned intermediate the capillary opposing ends such that the capillary outer surface proximate each opposing end is left uncovered by the molded flange. In the example shown in the drawings, the overall length of flange 14 is about one third of the length of capillary 12 and flange 14 is positioned approximately midway between the capillary opposing ends. For purposes of positioning and securing ferrule 10 within the body of a fiber optic connector, flange 14 has a large diameter portion 141 and a small diameter portion 142. The overall length of flange 14, the lengths of large diameter portion 141 and small diameter portion 142 and the respective diameters of large diameter portion 141 and small diameter portion 142 can be precisely controlled by appropriate mold design and selection of molding material, to satisfy any number of mounting and positioning requirements. In order to fabricate the precision locating surfaces of flange 14, the molding material used for flange 14 should have sufficient hardness, strength, dimensional stability and also limited mold shrinkage. Examples of suitable molding materials include resins such as PBT containing glass fiber, poly-etherimide, liquid crystal polymer containing glass fiber or the like.

FIG. 3 is a cross-sectional view of a mold 20 used in forming the plastic flange in the above-described embodiment of the present invention. Mold 20 comprises a stationary mold portion 21, a lower mold portion 23 and an upper mold portion 22 which may be moved up and down. Mold portions 21, 22 and 23 combine to form a cavity 24 for positioning and securing capillary 12 and receiving the flange molding material, thereby defining the shape of flange 14. Stationary mold portion 21 has a first end holding hole 25 for inserting and positioning a first end of capillary 12. A second end holding hole 27 for holding the opposite end of capillary 12 is formed by joining upper and lower mold portions 23 and 22, respectively. A movable member 26 is provided which extends into first end holding hole 25 for forcing the opposite end of capillary 12 fully into second end holding hole 27 prior to molding, and for forcing capillary 12 out of first end holding hole 25 after molding. An injection hole 28 is provided in upper mold portion 22 for injecting molten resin into cavity 24.

FIG. 4 is a cross-sectional view of the mold of FIG. 3 showing the injection of a plastic material 29 into mold 20 to produce an embodiment of the ferrule of the present invention. Prior to injection of the plastic, capillary 12 is inserted into stationary mold portion 21. Stationary mold portion 21 is placed into a mold base adjacent lower mold portion 23 and upper mold portion 22 is placed atop lower mold portion 23 and secured. Subsequently, as shown in FIG. 4, the molten plastic 29 is injected into cavity 24 through injection hole 28. When molten plastic 29 is injected, plastic 29 advances into the mold to fill the interior of cavity 24, simultaneously filling recess portion 15. Thus, projecting portion 16, which extends intimately into the recess portion 15, is formed integrally with molded flange 14. After cooling of the molten plastic, ferrule 10 is removed from the mold and an attenuation optical fiber is inserted into hole 11 of capillary 12 and secured therein using adhesives or the like, as described above. The end faces of the optical fiber at the opposing ends of capillary 12 are then prepared by polishing as desired, in a manner known in the art.

FIGS. 5 and 6 show the mounting of the ferrule of the present invention in a an optical connector. Ferrule 10 is mounted within a connector body 33 of a connector 30. Connector body 33 comprises a first body portion 31 and a second body portion 32 connected to each other in an axial manner.

A first reception portion 34 for receiving flange 14 of ferrule 10 is provided within first body portion 31. First reception portion 34 has a large diameter reception portion 39 for receiving large diameter portion 141 of ferrule 10, in a manner to be described later. A second reception portion 38 is provided in the first body portion 31 in the vicinity of the first reception portion 34, for receiving an exposed portion 102 of capillary 12 at the opposite end of the ferrule large diameter portion 141 of ferrule 10 is received within large diameter reception portion 39, and small diameter portion 142 of ferrule 10 is received within an inner circumferential surface of insertion sleeve 35, thereby effecting two-stage holding of ferrule 10 within connector body 33. First body portion 31 also includes a locking member 40.

An insertion sleeve 35 is provided in second body portion 32 for insertion into first reception portion 34 of first body portion 31. A first end of ferrule 10 is inserted into insertion sleeve 35 and is held within insertion sleeve 35 through a ring-shaped spacer 36. Insertion sleeve 35 is longer than an exposed portion 101 of capillary 12 at one end of the capillary. Accordingly, a second capillary portion of a ferrule mounted on another connector (not shown), such as a receptacle or the like, may be inserted into the opposite end of insertion sleeve 35 from and connected to effect coaxial alignment of the respective optical fibers. In order to coaxially align capillary 12 and the second capillary, a second sleeve 37 is provided within insertion sleeve 35. Second body portion 32 also includes a locking member 41.

In an alternative embodiment of the ferrule of the present invention, the projecting portion may be formed in the outer surface of the capillary prior to molding of the flange, and the molding material may fill in a space surrounding the projection portion during the molding operation. In an additional embodiment, rather than having a large diameter portion and a small diameter portion, the molded flange may have a uniform outside diameter. The molded flange may also be formed in a wide variety of alternative shapes to satisfy a variety of ferrule mounting and positioning requirements.

It should be understood that the preceding is merely a detailed description of one embodiment of this invention and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

I claim:

1. A ferrule for an optical fiber connector comprising:
   a capillary having a pair of opposing ends, an outer surface extending between the opposing ends and a hole extending between the opposing ends for insertion of an optical fiber strand therein;
   a flange molded onto the capillary outer surface intermediate the capillary opposing ends such that the capillary outer surface proximate each opposing end is not covered by the molded flange; and
   a recess portion and a complementary projecting portion extending into the recess portion, the recess portion and projecting portion being formed at an interface between the capillary outer surface and the flange.

2. The ferrule of claim 1, wherein the recess portion is formed in the capillary outer surface and the projecting portion is formed integral with the flange.

3. The ferrule of claim 1, wherein the recess portion is formed integral with the flange and the projecting portion is formed in the capillary outer surface.

4. The ferrule of claim 1, wherein the flange has a cylindrical outer surface comprising a large diameter portion and a small diameter portion.

5. A method for manufacturing a ferrule for an optical fiber connector comprising the step of:
   molding a flange onto an outer surface of a capillary intermediate opposite ends of the capillary such that the capillary outer surface proximate each opposing end is not covered by the molded flange;
   forming a recess portion in the outer surface of the capillary prior to molding; and
   forming, integral with the flange, a complementary projecting portion that extends intimately into the recess portion of the capillary outer surface during molding of the flange.

6. The method for manufacturing a ferrule according to claim 5, further comprising the steps of:
   forming a projecting portion in the outer surface of the capillary; and
   filling a space surrounding the projecting portion with a molding material during molding.

7. The method for manufacturing a ferrule according to claim 5 wherein said capillary is provided of one material and the flange is molded of a different material.

8. The method for manufacturing a ferrule according to claim 7 wherein said capillary is provided of a hard material and the flange is molded of a softer plastic material.

9. The method for manufacturing a ferrule according to claim 7 wherein said capillary is provided of a material such as zirconia.

10. The method for manufacturing a ferrule according to claim 7 wherein said flange is molded of a material including resins such as PBT containing glass fiber, poly-etherimide and a liquid crystal polymer containing glass fiber.

11. The method for manufacturing a ferrule according to claim 10 wherein said capillary is provided of a material such as zirconia.

12. The ferrule of claim 1 wherein said capillary and said flange comprise different materials.

13. The ferrule of claim 12 wherein said capillary comprises a hard material and the flange comprises a softer plastic material.

14. The ferrule of claim 12 wherein said capillary comprises a material such as zirconia.

15. The ferrule of claim 12 wherein said flange comprises a material including resins such as PBT containing glass fiber, poly-etherimide and a liquid crystal polymer containing glass fiber.

16. The ferrule of claim 15 wherein said capillary comprises a material such as zirconia.

17. The ferrule of claim 1, wherein the flange is molded from a plastic material.

* * * * *